(12) United States Patent
Ebenezer

(10) Patent No.: US 6,864,360 B2
(45) Date of Patent: Mar. 8, 2005

(54) REACTIVE TRISAZO DYES

(75) Inventor: Warren James Ebenezer, Stockport (GB)

(73) Assignee: DyStar Textilfarben GmbH & Co. Deutschland KG (DE)

( * ) Notice: Subject to any disclaimer, the term of this patent is extended or adjusted under 35 U.S.C. 154(b) by 32 days.

(21) Appl. No.: 10/332,116

(22) PCT Filed: Jul. 21, 2001

(86) PCT No.: PCT/EP01/08465
§ 371 (c)(1),
(2), (4) Date: Feb. 6, 2003

(87) PCT Pub. No.: WO02/10287
PCT Pub. Date: Feb. 7, 2002

(65) Prior Publication Data
US 2003/0195341 A1 Oct. 16, 2003

(30) Foreign Application Priority Data
Jul. 27, 2000 (GB) .............................. 0018508

(51) Int. Cl.$^7$ .................. C09B 62/513; D06P 1/384
(52) U.S. Cl. .................. 534/612; 534/634; 8/547; 8/549
(58) Field of Search ................. 534/634, 612; 8/547, 549

(56) References Cited

U.S. PATENT DOCUMENTS

| | | | |
|---|---|---|---|
| 3,647,778 A | * | 3/1972 | Andrew et al. ............. 534/634 |
| 6,180,765 B1 | * | 1/2001 | Ebenezer ................... 534/634 |
| 6,372,893 B1 | * | 4/2002 | Nusser ....................... 534/634 |

FOREIGN PATENT DOCUMENTS

| | | |
|---|---|---|
| GB | 1 283 771 | 8/1972 |
| WO | WO 99/05223 | 2/1999 |

* cited by examiner

Primary Examiner—Fiona T. Powers
(74) Attorney, Agent, or Firm—Connolly Bove Lodge & Hutz LLP

(57) ABSTRACT

The present invention refers to trisazo dyes of the formula I (I)

or an alkali metal salt thereof; wherein:
$Ar_1$ is an optionally substituted arylene group;
$Ar_2$ is an optionally substituted aryl group;
$R^1$, $R^2$, $R^3$, $R^4$, $X^1$ and $X^2$ are defined as given in claim 1;
each of $D^1$ and $D^2$, independently, is a chromophore group of the formula (IV)

wherein the variables are defined as given in claim 1, a process for their preparation and a process for colouring fibre material containing a group reactive with a reactive dye.

13 Claims, No Drawings

REACTIVE TRISAZO DYES

This invention relates to reactive dyes containing two units each comprising a monoazo chromophore linked to a triazinylamino group, each of which units is linked by a diamine unit disposed between the triazine rings.

GB-A-1283771 discloses a range of reactive diamine dyes of the formula (A)

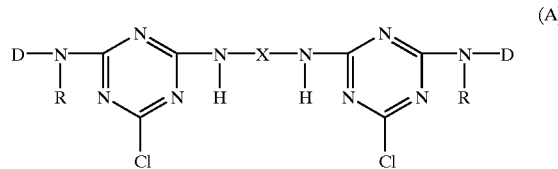

(A)

where D is naphthylazo-phenylene or -naphthalene containing at least 3 sulphonic acid groups, R is H or an optional substituted $C_{1-4}$ alkyl group and the linking group —N(H)—X—N(H)— is derived specifically from a phenylene, diphenylene or naphthalene diamine. They offer a degree of fixation over a wide range of liquor to goods ratios and provide shades of very good light fastness.

WO-A-99/05223 discloses a range of dyes in which the diamine unit disposed between the triazine rings itself forms part of a chromophoric group. Such dyes have the formula

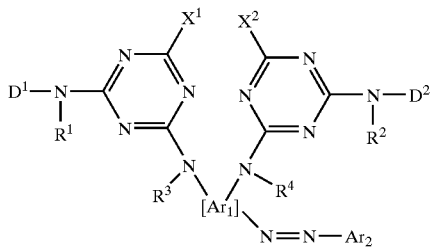

wherein:

$Ar_1$ is an optionally substituted arylene group;

$Ar_2$ is an optionally substituted aryl group;

each of $D^1$ and $D^2$, independently, is a chromophoric group;

each of $R^1$, $R^2$, $R^3$ and $R^4$, independently, is H or alkyl; and each of $X^1$ and $X^2$ independently, is a labile atom or group.

Such dyes provide excellent build up properties, as well as excellent light fastness and aqueous solubility. Moreover, the dyes offer a degree of fixation over a wide range of liquor to goods ratios.

However, none of the dyes disclosed in the abovementioned documents provide a particularly strong or bright yellow, reddish yellow or red shade with good migration properties, excellent build-up and good fastness properties.

Thus, the problem addressed by the invention is to provide such a dye capable of giving, particularly on cellulosic fabrics, a strong, bright yellow, reddish yellow or red shade with good migration properties, excellent build-up and which dyes are particularly easy and economical to produce.

We find surprisingly that it is possible to solve the abovementioned problems by the use of a trisazo dye in which two monoazo triazine dyes, the respective monoazo dye components of which are each based on a sulphonated naphthol, especially sulpho-J-acid, as coupling component and a markedly electron deficient aromatic amine as diazo component, are linked, via the respective triazine groups, by a diamine unit which itself forms part of a monoazo chromophore. Moreover, such dyes colour cloth more economically than those of WO-A-99/05223.

Thus, according to one aspect the invention provides a trisazo dye of the formula (I)

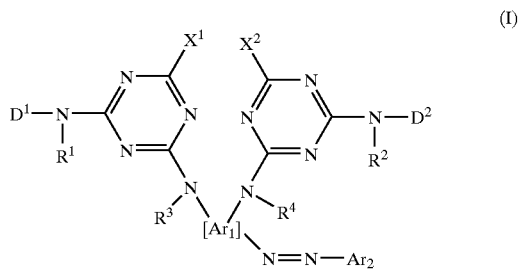

(I)

or an alkali metal salt thereof; wherein:

$Ar_1$ is an optionally substituted arylene group;

$Ar_2$ is an optionally substituted aryl group;

each of $R^1$, $R^2$, $R^3$ and $R^4$, independently, is H, alkyl or phenyl;

each of $X^1$ and $X^2$, independently, is a labile atom or group; and each of $D^1$ and $D^2{}_1$ independently, is a chromophore group of the formula

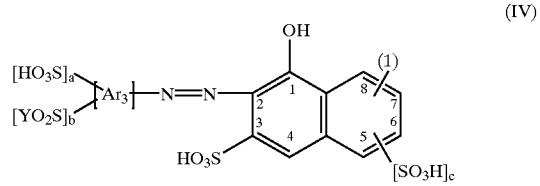

(IV)

wherein:

$Ar_3$ is an aryl group;

Y is a vinyl or allyl group or the group —$CH_2CH_2V$ in which V is a leaving group;

a is zero, 1, 2 or 3;

b is zero, 1 or 2;

at least one of a and b is at least 1;

c is zero or 1 and when c is 1, the group $SO_3H$ on the naphthalene nucleus is substituted at the 5- or 6-position thereof; and the bond (1) is substituted at the 6-, 7- or 8-position of the naphthalene nucleus.

In the above formula (I), each of $X^1$ and $X^2$, independently, is preferably a halogen atom or a pyridinium salt. More preferably, each of $X^1$ and $X^2$, independently, is F or Cl and most preferably each of $X^1$ and $X^2$ is Cl.

It is also preferred that each of $R^1$, $R^2$, $R^3$ and $R^4$, independently, is H or $C_{1-5}$ alkyl, especially hydrogen, methyl, ethyl or n- or i-propyl.

The group $Ar_1$ is preferably an optionally substituted phenylene, naphthylene or diphenylene group and more preferably forms part of a dye having the formula (II)

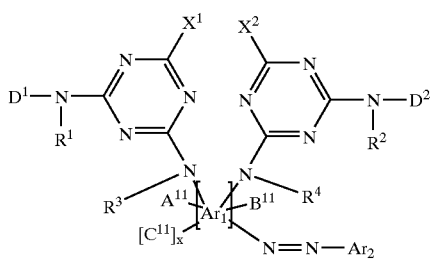

(II)

wherein:

Ar$_1$ is a phenylene, naphthylene or diphenylene group;

each of A$^{11}$ and B$^{11}$, independently, is optionally present and is a halogen atom, an alkyl group, an alkoxy group, a hydroxy group, a carboxyl group or a sulphonic acid group or a salt thereof;

C$^{11}$ is a methyl group;

x is zero or 1; and each of D$^1$, D$^2$, R$^1$, R$^2$, R$^3$, R$^4$, X$^1$, X$^2$ and Ar$_2$ is as defined above.

A more preferred range of dyes has the formula (III)

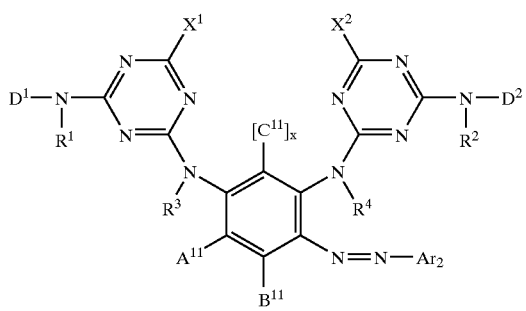

(III)

wherein each of D$^1$, D$^2$, R$^1$, R$^2$, R$^3$ R$^4$, X$^1$, X$^2$, Ar$_2$, A$^{11}$, B$^{11}$, C$^{11}$ and x is as defined above.

In the above formulae (I), (II) and (III), Ar$_2$ is preferably an optionally substituted phenyl group, more preferably a phenyl group which is unsubstituted or substituted by at least one substituent, the or each substituent independently being selected from sulphonic acid, alkyl, carboxyl, alkyl carboxylic acid ester, nitro and vinylsulphone and precursors thereof, especially at least one sulphonic acid group.

When Ar$_2$ is a phenyl group, this may be substituted or additionally substituted by a group of the formula

[Z]$_k$—⟨phenyl⟩—C=C— wherein Z, or each Z independently, is selected from sulphonic acid, alkyl, carboxyl, alkyl carboxylic acid ester, nitro and vinyl sulphone and precursors thereof and k is 1 or 2.

In an alternative preferred range of dyes, Ar$_2$ is an optionally substituted naphthalene group, which is more preferably substituted by at least one sulphonic acid group.

Referring now to the chromophoric groups D$^1$ and D$^2$, which may be the same as or different from one another, in each of the formulae (IV) of D$^1$ and D$^2$ respectively, it is preferred that each of a and b be at least 1.

Each of D$^1$ and D$^2$, independently, is preferably a chromophore of the formula

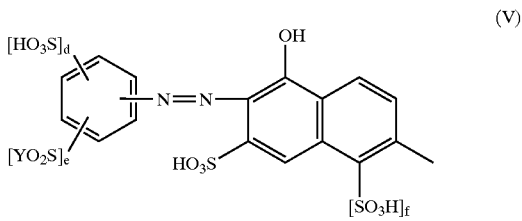

(V)

wherein:

d is zero, 1 or 2;

e is zero or 1;

f is zero or 1; and

Y is as defined above.

More preferably, each of D$^1$ and D$^2$, independently is a chromophore of the formula

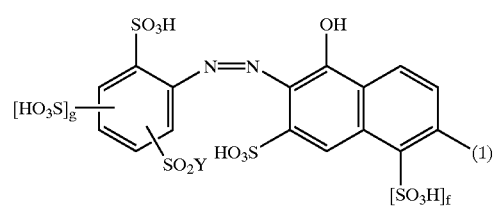

(VI)

wherein Y is as defined above and each of f and g, independently, is zero or 1.

Still more preferably, each of D$^1$ and D$^2$, independently, is a chromophore of the formula

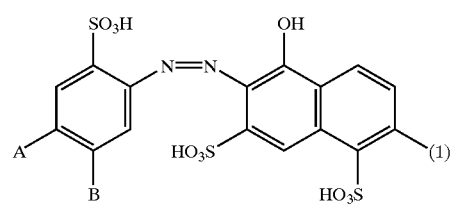

(VII)

wherein one of A and B is the group [SO$_3$H]$_g$ in which g is zero or 1 and the other of A and B is the group SO$_2$Y, in which Y is as defined above.

In especially preferred respective dyes of the formula (VII), (a) A is the group SO$_2$Y, in which Y is as defined above and B is the group [SO$_3$H]$_g$, in which g is zero, and (b) A is the group [SO$_3$H]$_g$, in which g is 1, and B is the group SO$_2$Y, in which Y is as defined above.

In a preferred range of dyes alternative to those in which each of $D^1$ and $D^2$ is a chromophore of the formula (V), each of $D^1$ and $D^2$, independently, is a chromophore of the formula (VIII)

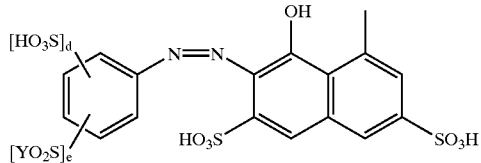

wherein each of Y, d and e is as defined above.

More preferably, in such a range of dyes, each of $D^1$ and $D^2$, independently, is a chromophore of the formula (IX)

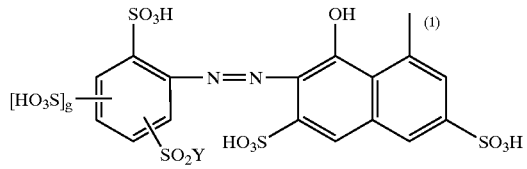

wherein Y is as defined above and g is zero or 1.

Still more preferably, each of $D^1$ and $D^2$, independently, is a chromophore of the formula (X)

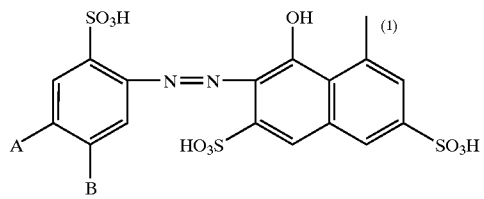

wherein one of A and B is the group $[SO_3H]_g$, in which g is zero or 1, and the other of A and B is the group $SO_2Y$, in which Y is as defined above.

In especially preferred respective dyes of the formula (X),
(a) A is the group $SO_2Y$, in which Y is as defined above, and B is the group $[SO_3H]_g$, in which g is zero; and
(b) A is the group $[SO_3H]_g$, in which g is 1, and B is the group $SO_2Y$, in which Y is as defined above.

In yet another alternative preferred range of dyes, each of $D^1$ and $D^2$, independently is a chromophore of the formula (XI)

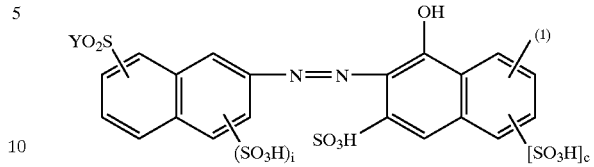

wherein i is 1, 2 or 3 and a group $SO_3H$ is ortho to-the azo group; and each of Y and c is as defined above.

Especially preferred specific examples of dyes within the range of dyes of the formula (V), defined above, are respective dyes of the formula (XII)

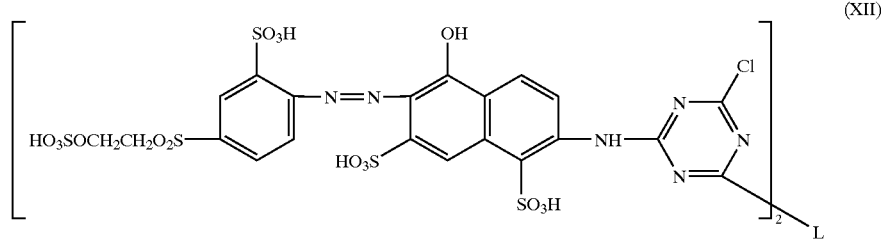

where L is selected from:

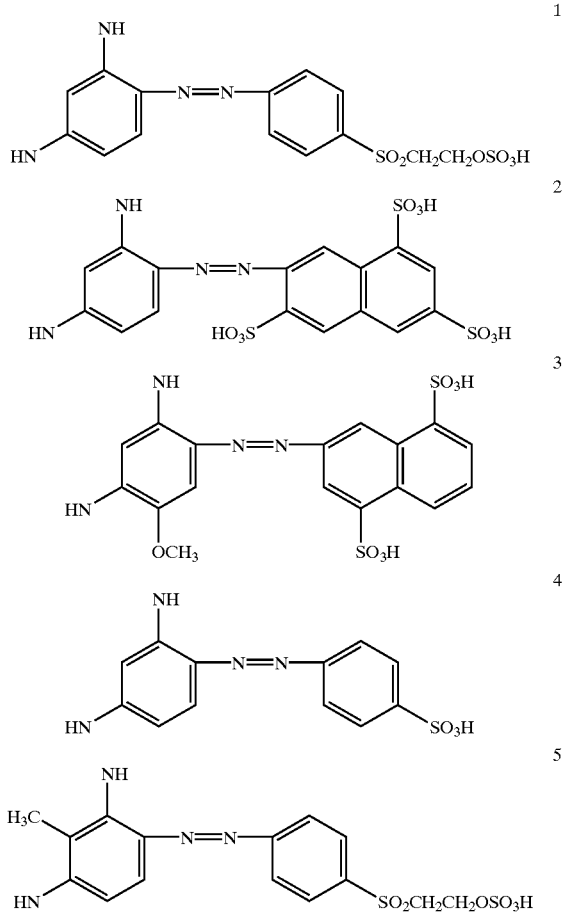

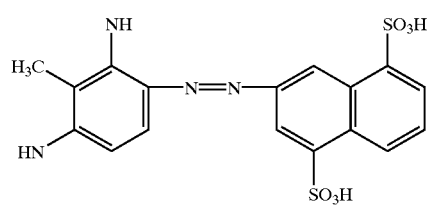
5
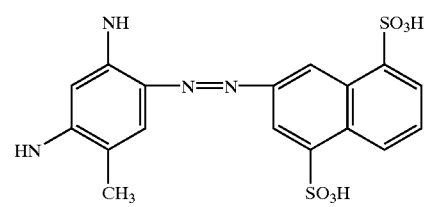
7
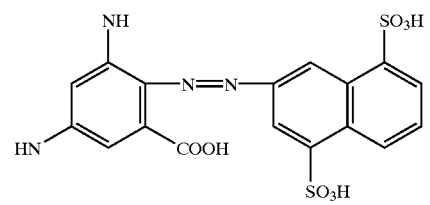
8
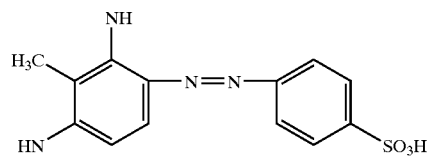
9
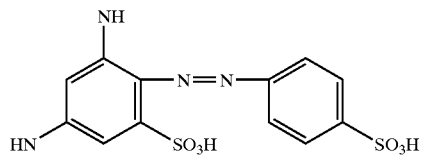
10
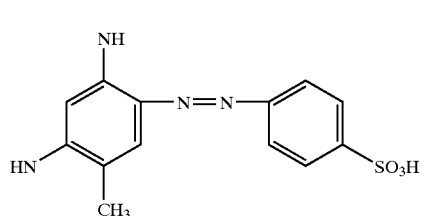
11
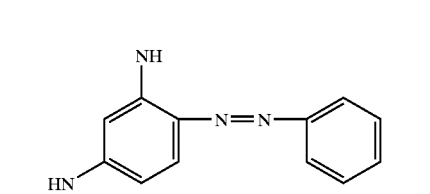
12
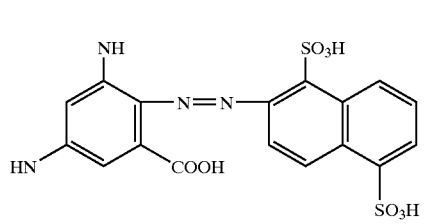
13
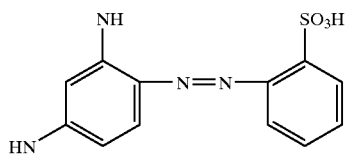
14
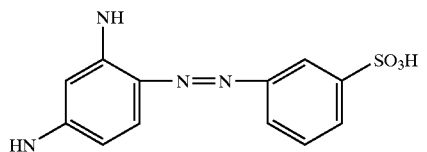
15
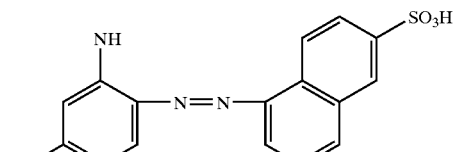
16
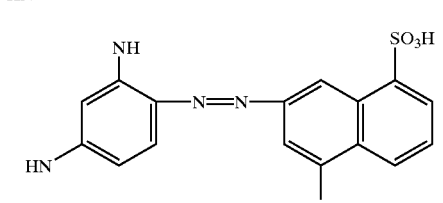
17
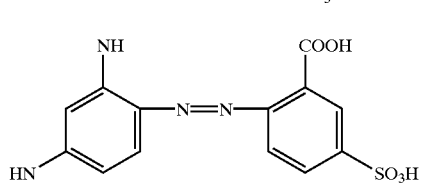
18
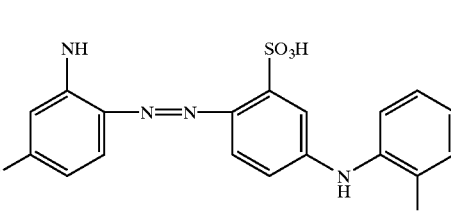
19
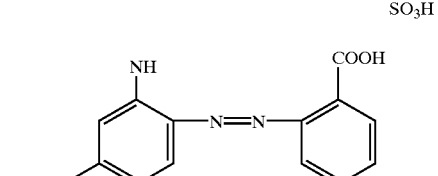
20
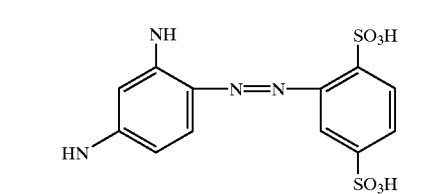
21
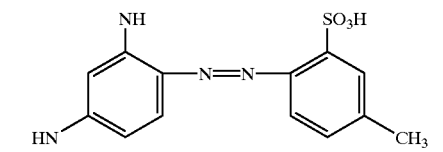
22

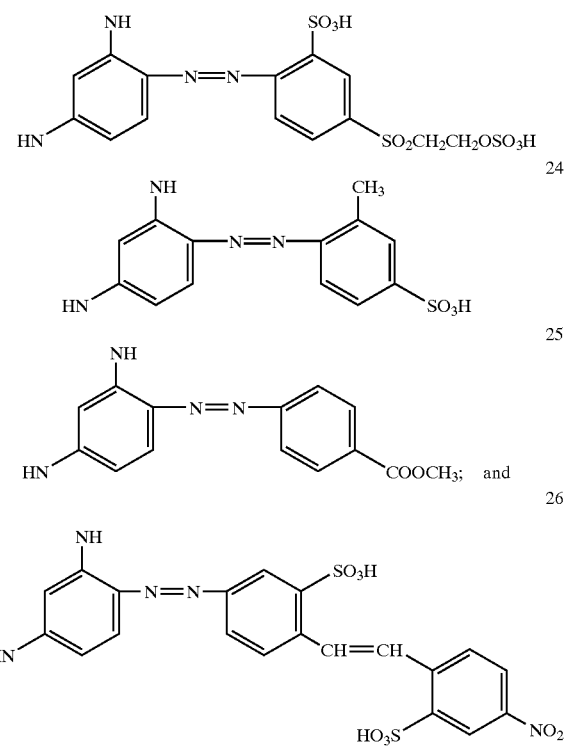

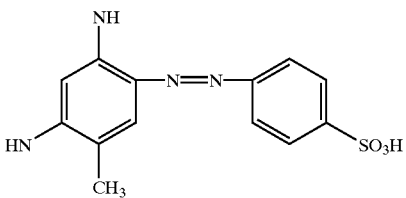

Especially preferred specific examples of dyes within the range of dyes of the formula (IX), defined above are respective dyes of the formula

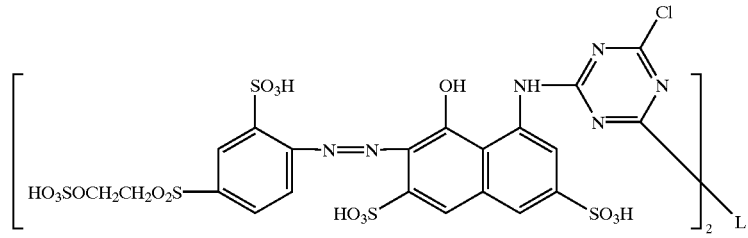

where L is selected from:

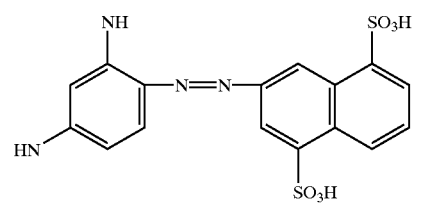

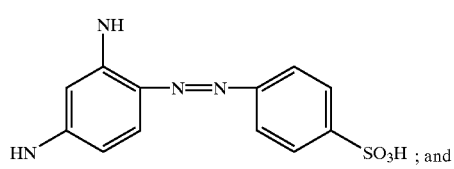

The dyestuffs of the present invention can be present as a preparation in solid or liquid (dissolved) form. In solid form they generally contain the electrolyte salts customary in the case of water-soluble and in particular fibre-reactive dyes, such as sodium chloride, potassium chloride and sodium sulfate, and also the auxiliaries customary in commercial dyes, such as buffer substances capable of establishing a pH in aqueous solution between 3 and 7, such as sodium acetate, sodium borate, sodium bicarbonate, sodium citrate, sodium dihydrogen-phosphate and disodium hydrogenphosphate, small amounts of siccatives or, if they are present in liquid, aqueous solution (including the presence of thickeners of the type customary in print pastes), substances which ensure the permanence of these preparations, for example mold preventatives.

In general, the dyestuffs of the present invention are present as dye powders containing 10 to 80% by weight, based on the dye powder or preparation, of a strength-standardizing colorless diluent electrolyte salt, such as those mentioned above. These dye powders may additionally include the aforementioned buffer substances in a total amount of up to 10%, based on the dye powder. If the dye mixtures of the present invention are present in aqueous solution, the total dye content of these aqueous solutions is up to about 50% by weight, for example between 5 and 50% by weight, and the electrolyte salt content of these aqueous solutions will preferably be below 10% by weight, based on the aqueous solutions. The aqueous solutions (liquid preparations) may include the aforementioned buffer substances in an amount which is generally up to 10% by weight, for example 0.1 to 10% by weight, preference being given to up to 4% by weight, especially 2 to 4% by weight.

A trisazo dye of the formula (I), given and defined above, may be prepared by a process which comprises reacting an arylazodiamine of the formula (XIV)

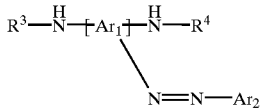

wherein each of $Ar_1$, $Ar_2$, $R^3$ and $R^4$ is as defined above, with an equimolar proportion of each of two reactive dyes respectively of the formula

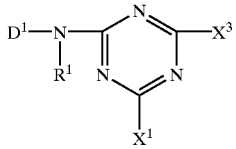

(XV)

wherein each of $D^1$, $R^1$ and $X^1$ is as defined above and $X^3$ is a labile atom or group capable of reaction with an amine and

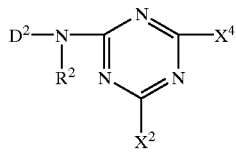

(XVI)

wherein each of $D^2$, $R^2$ and $X^2$ is as defined above and $X^4$ is a labile atom or group capable of reaction with an amine, or when each of $D^1$, $R^1$, $X^1$ and $X^3$ is the same as $D^2$, $R^2$, $X^2$ and $X^4$ respectively, with two moles of a reactive dye of the formula (XV) or (XVI) per mole of the diamine of the formula (XIV), to obtain the dye of the formula (I).

The process is preferably carried out in an aqueous solution at pH 4–6 and at a temperature of at least 30° C.

In such a process, when each of $D^1$, $R^1$ and $X^1$, in the formula (I), is the same as $D^2$, $R^2$ and $X^2$ respectively, a single triazine dye may be employed and this may have the formula

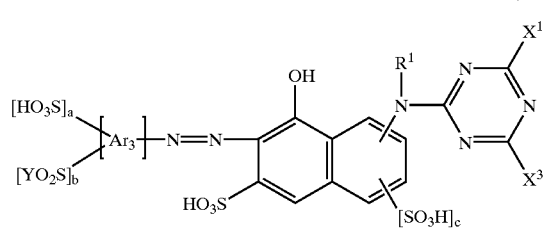

(XVII)

However, if any of $D^1$, $R^1$ and $X^1$ is different from $D^2$, $R^2$ and $X^2$ respectively, it is necessary to employ an additional triazine dye which may have the formula

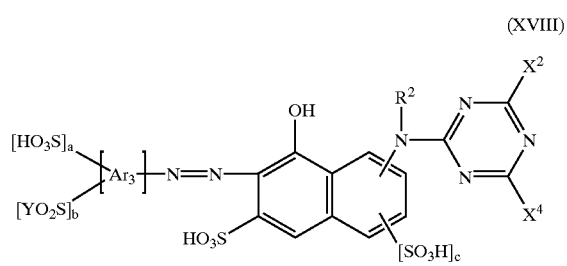

(XVIII)

In the respective formulae (XVII) and (XVIII), each of $Ar_3$, $R^1$, $R^2$, $X^1$, $X^2$, a, b and c is as defined above;
each of $Ar_3$, a, b and c in respective formula (XVII) and (XVIII) may be the same as or different from the other; and each of $X^3$ and $X^4$ independently is a labile atom or group capable of reaction with an amine.

Such triazine dyes may be prepared either separately or together by diazotizing one or two amine(s) of the formula

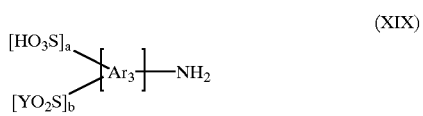

(XIX)

wherein each of $Ar_3$, a and b is as defined above; and coupling the diazotized amine(s) of the formula (XIX) to a triazine compound of the formula

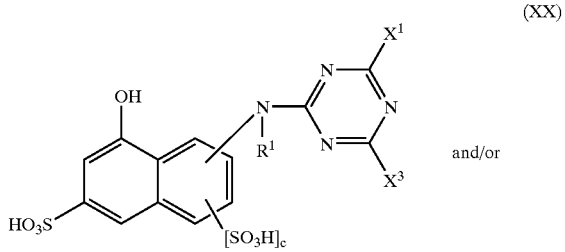

(XX)

and/or

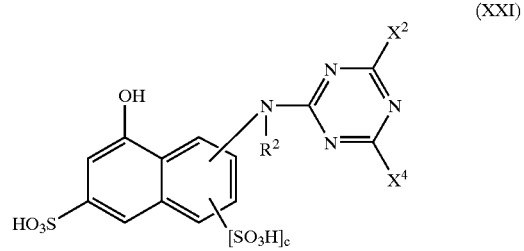

(XXI)

wherein each of $R^1$, $R^2$, $X^1$, $X^2$, $X^3$ and $X^4$ and c is as defined above; to obtain the triazine dye(s) of the formula (XVII) and/or (XVIII).

Typically, diazotisation of the amine is carried out in an acid medium at a pH of about 2–5, using, for example, acetic, propionic or hydrochloric acid in the presence of a nitrosating agent, such as nitrosyl sulphuric acid, an alkali metal nitrite (e.g. sodium nitrite) or a $C_{1-4}$ alkyl nitrite (e.g. methyl nitrite) at a temperature of from −10° C. to 10° C.

The coupling reaction may be carried out by adding the diazotised amine(s) of the formula (XIX), to the triazine compound(s) of the formula (XX) and/or (XXI) in water at a temperature of from 0 to 10° C.

The triazine compound of the formula (XX) and/or (XXI), given and defined above, may be prepared by reacting an aminonaphthalenesulphonic acid compound of the formula (XXII)

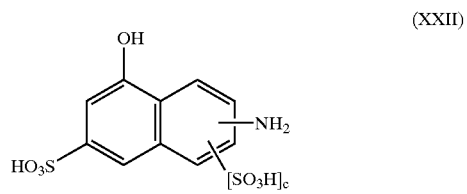

(XXII)

wherein c is as defined above;

with a cyanuric halide of the formula (XXIII) and/or (XXIV)

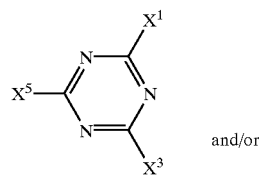

(XXIII)

and/or

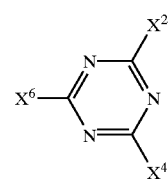

(XXIV)

wherein each of $X^5$ and $X^6$ is a labile atom or group capable of reaction with an amine and each of $X^1$, $X^2$, $X^3$ and $X^4$ is as defined above, to form the triazine compound of the formula (XX) and/or (XXI).

The reaction may be carried out by adding the aminonaphthalene sulphonic acid compound of the formula (XXII) dropwise to a slurry of the cyanuric halide of the formula (XXIII) and/or (XXIV) in an ice/water/acetone mixture.

Dyes embodying the invention may be applied alone or in admixture with other dyestuffs.

Although in this specification, dye formulae have been shown in the form of their free acid, the invention also includes dyes and processes using dyes in the salt form, particularly their salts with alkali metals such as the potassium, sodium, lithium or mixed sodium/lithium salt.

The dyes may be used for dyeing, printing or ink-jet printing, for example of textile materials and paper.

The process for colouration is preferably performed at a pH of 7.1 to 13, more preferably 10 to 12. pH levels above 7 can be achieved by performing the process for colouration in the presence of an acid-binding agent. They can be applied at any temperature from room temperature (e.g. 15° C.) to 80° C., preferably from 40 to 60° C.

The substrate may be any of fibre material such as a textile material, leather, paper, hair or film, but is preferably a natural or artificial textile material containing amino or hydroxyl groups, for example textile material such as wool, silk, polyamides and modified polyacrylonitrile fibres, and more preferably a cellulose, for example, that commercially available as Tencel. For this purpose the dyes can be applied to the textile materials at a pH above 7 by, for example, exhaust dyeing, padding or printing. Textile materials are coloured bright shades and possess good fastness to light and wet treatments such as washing.

The new dyes are particularly valuable for colouring cellulosic textile materials. For this purpose, the dyes are preferably applied to the cellulosic textile material at a pH above 7 in conjunction with a treatment with an acid-binding agent.

Preferred acid-binding agents include alkali metal carbonates, bicarbonates, hydroxides, metasilicates and mixtures thereof, for example sodium bicarbonate, sodium carbonate, sodium metasilicate, sodium hydroxide and the corresponding potassium salts. The dyes benefit from excellent build-up and high fixation.

The new dyes can be applied to textile materials containing amine groups, such as wool and polyamide textile materials, from a neutral to mildly alkaline dyebath. The dyeing process can be carried out at a constant or substantially constant pH, that it to say the pH of the dyebath remains constant or substantially constant during the dyeing process, or if desired the pH of the dyebath can be altered at any stage of the dyeing process.

According to yet another aspect of the invention there is provided a process for colouring a fibre material containing a group reactive with a reactive dye or a fibre blend containing the fibre material, which method comprises applying thereto a dye of the formula (1), given and defined above, preferably at a pH above 7.

Preferred embodiments of the invention will now be described in more detail with reference to the following Examples, in which all parts are by weight unless otherwise stated.

EXAMPLE 1

Preparation of the dye:

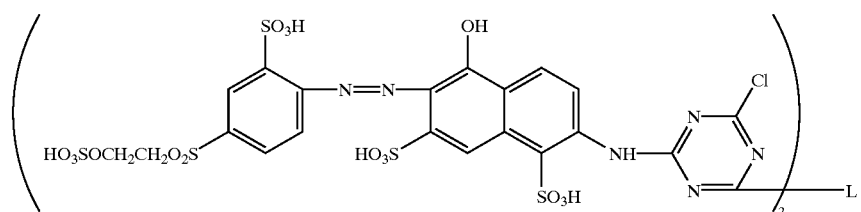

where L is as chromophoric linking group of the formula

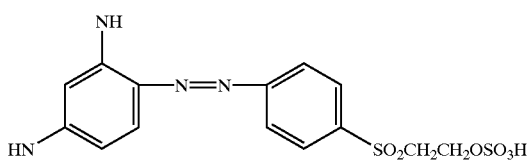

The process may be represented by the following reaction scheme.

Step 1

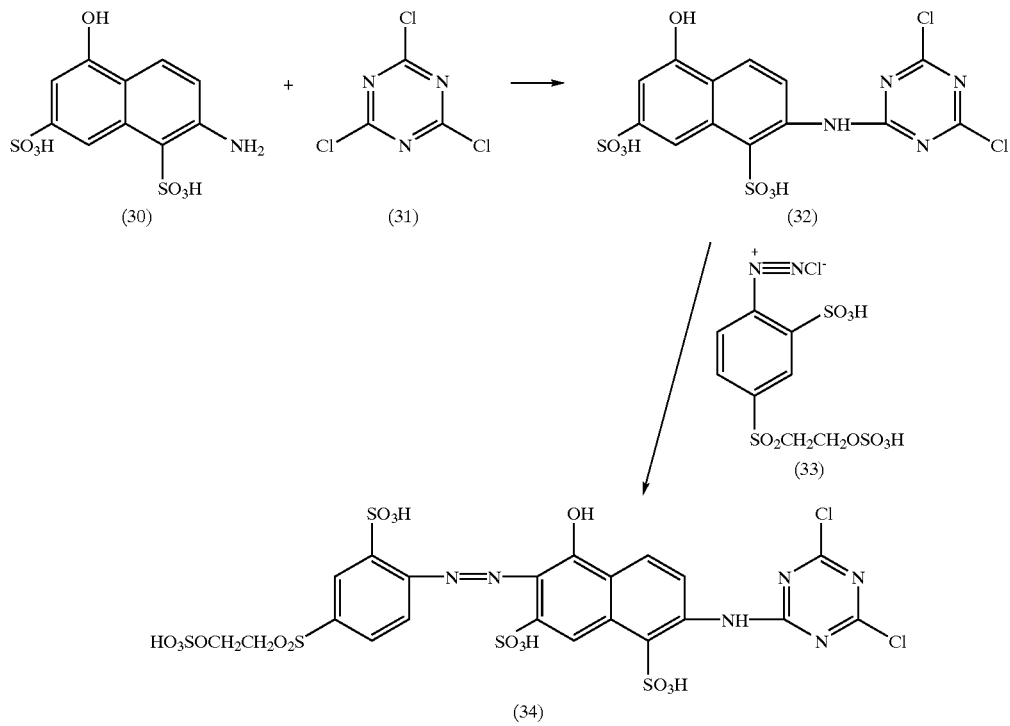

Step 2

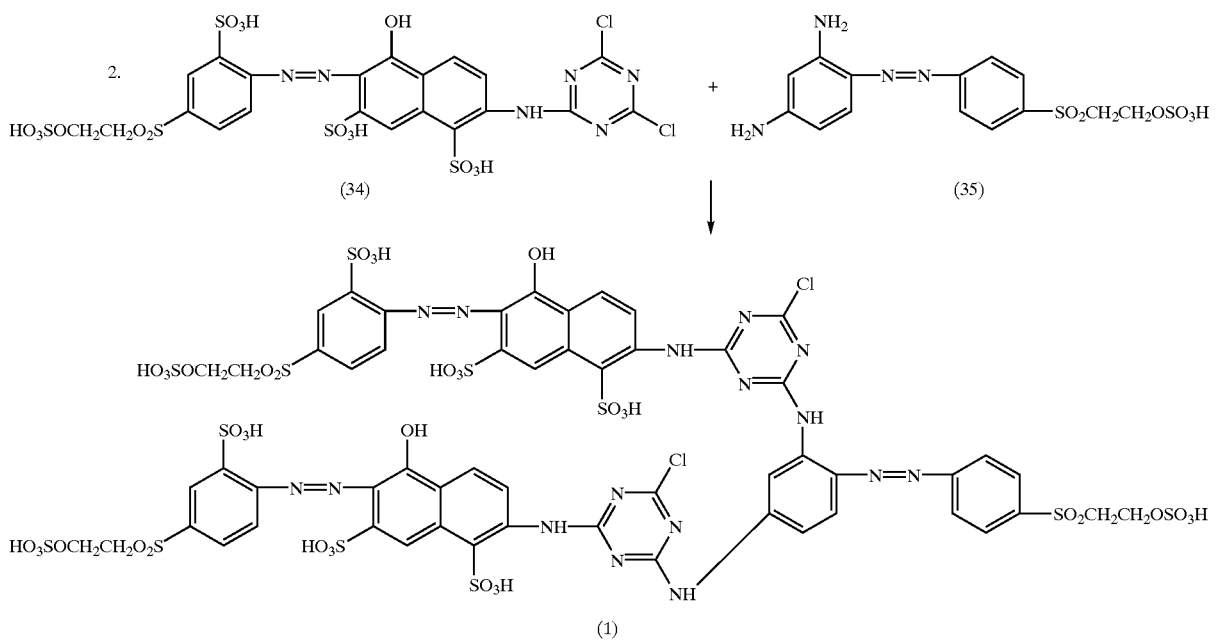

A solution of 2-amino-5-hydroxy-1,7-naphthalene disulphonic acid (30) (39.0 g, 0.08 mol) in water (500 mls) was added dropwise to a slurry of cyanuric chloride (31) (16.2 g, 0.088 mol) in an ice/water/acetone mixture and stirred for 1 hr, furnishing a solution of the dichlorotriazinyl coupler (32).

2N Sodium nitrite solution (51 mls) was added dropwise to an ice cold slurry of 2-amino-5-(-sulphatoethyl sulphone) benzene sulphonic acid (45.2 g, 0.093 mol) and concentrated HCl (30 mls) in water (500 mls). After 1 hr, excess nitrous acid was destroyed, by addition of sulphamic acid, leaving a solution of the diazonium salt (33). The solution of the diazonium salt was then added to the dichlorotriazine solution (32) and the mixture allowed to warm to room temperature maintaining the pH at 6. After 4 hrs the resulting precipitate was filtered off and dried to give the reddish yellow dichlorotriazinyl dye (70 g) (34). Analytical data were in full agreement with the expected structure.

A mixture of the dichlorotriazinyl dye (34) (8.0 g, 0.007 mol) and diamine (35) (1.9 g, 0.0035 mol) in water (200 mls)

at pH 5.5 was heated at 60° C. for 5 hrs, the pH being maintained by the addition of 2N sodium carbonate. The mixture was cooled and the product precipitated by the addition of methylated spirits. The precipitate was filtered off and dried to give reactive dye (1) (6.6 g) max=480 nm=75000. Analytical data were in full agreement with the expected structure.

EXAMPLES 2–26

In Examples 2–26, the chromophoric linking group L of Example 1 was replaced by the respective groups shown in Table 1 below and the dyes were prepared in a manner analogous to that of Example 1.

TABLE 1

| Example | L | max/nm |
|---------|---|--------|
| 1 | [structure: 2,4-diaminophenyl-N=N-phenyl-SO₂CH₂CH₂OSO₃H] | 480 |
| 2 | [structure: 2,4-diaminophenyl-N=N-naphthyl with 3 SO₃H groups] | 479 |
| 3 | [structure: 2,4-diamino-5-methoxyphenyl-N=N-naphthyl with 2 SO₃H groups] | 482 |
| 4 | [structure: 2,4-diaminophenyl-N=N-phenyl-SO₃H] | 480 |
| 5 | [structure: 2,4-diamino-3-methylphenyl-N=N-phenyl-SO₂CH₂CH₂OSO₃H] | 477 |
| 6 | [structure: 2,4-diamino-3-methylphenyl-N=N-naphthyl with 2 SO₃H groups] | 475 |
| 7 | [structure: 2,4-diamino-5-methylphenyl-N=N-naphthyl with 2 SO₃H groups] | 480 |

TABLE 1-continued

| Example | L | max/nm |
|---|---|---|
| 8 | 3,5-diamino-2-[(1,5-disulfo-naphthalen-3-yl)azo]benzoic acid | 479 |
| 9 | 2-amino-3-methyl-4-[(4-sulfophenyl)azo]aniline (structure with NH, H₃C, HN, N=N, SO₃H) | 476 |
| 10 | 3,5-diamino-2-[(4-sulfophenyl)azo]benzenesulfonic acid | 480 |
| 11 | 2,4-diamino-5-methyl-phenyl-azo-(4-sulfophenyl) | 481 |
| 12 | 2,4-diamino-phenyl-azo-phenyl | 482 |
| 13 | 3,5-diamino-2-[(1,5-disulfo-naphthalen-3-yl)azo]benzoic acid (isomer) | 479 |
| 14 | 2,4-diamino-phenyl-azo-(2-sulfophenyl) | 482 |
| 15 | 2,4-diamino-phenyl-azo-(3-sulfophenyl) | 482 |
| 16 | 2,4-diamino-phenyl-azo-(6-sulfo-naphthalen-2-yl) | 481 |

TABLE 1-continued

| Example | L | max/nm |
|---|---|---|
| 17 | 2,4-diaminophenyl–N=N–naphthyl(1,5-disulfonic acid) | 490 |
| 18 | 2,4-diaminophenyl–N=N–phenyl(2-COOH, 5-SO₃H) | 481 |
| 19 | 2,4-diaminophenyl–N=N–phenyl(2-SO₃H, 4-NH-phenyl(4-NO₂, 2-SO₃H)) | 476 |
| 20 | 2,4-diaminophenyl–N=N–phenyl(2-COOH) | 480 |
| 21 | 2,4-diaminophenyl–N=N–phenyl(2,5-disulfonic acid) | 481 |
| 22 | 2,4-diaminophenyl–N=N–phenyl(2-SO₃H, 4-CH₃) | 483 |
| 23 | 2,4-diaminophenyl–N=N–phenyl(2-SO₃H, 4-SO₂CH₂CH₂OSO₃H) | 481 |
| 24 | 2,4-diaminophenyl–N=N–phenyl(2-CH₃, 4-SO₃H) | 482 |
| 25 | 2,4-diaminophenyl–N=N–phenyl(4-COOCH₃) | 482 |

TABLE 1-continued
| Example | L | max/nm |
|---|---|---|
| 26 | 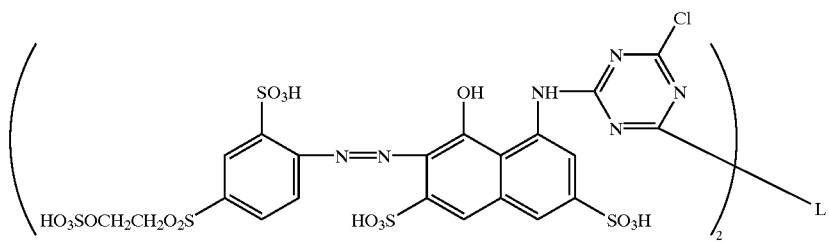 | 479 |
EXAMPLE 27
Preparation of the dye:
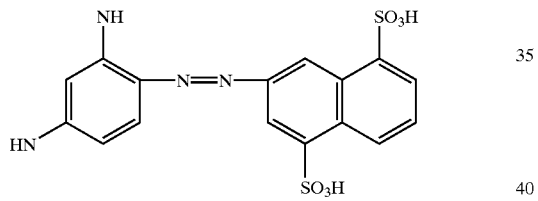
where L is a chromophoric linking group of the formula 27
The process may be represented by the following reaction scheme.
Step 1
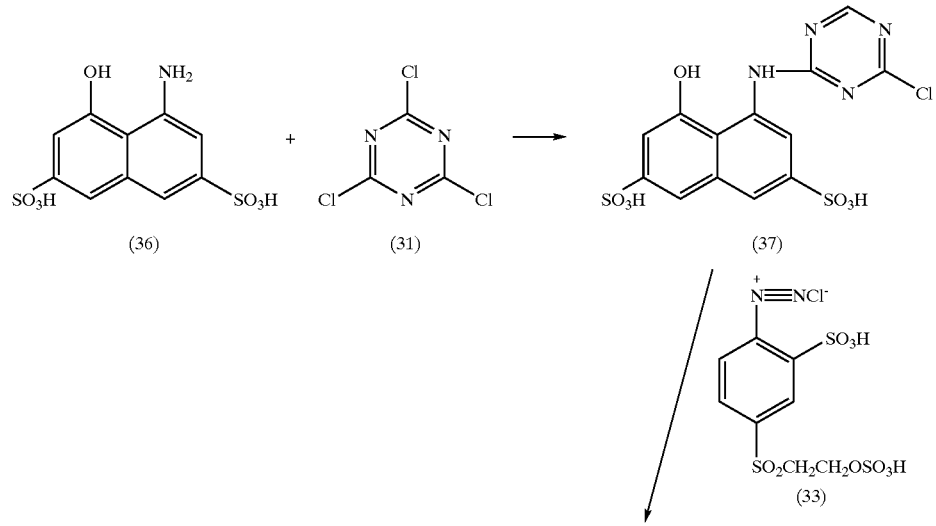

-continued

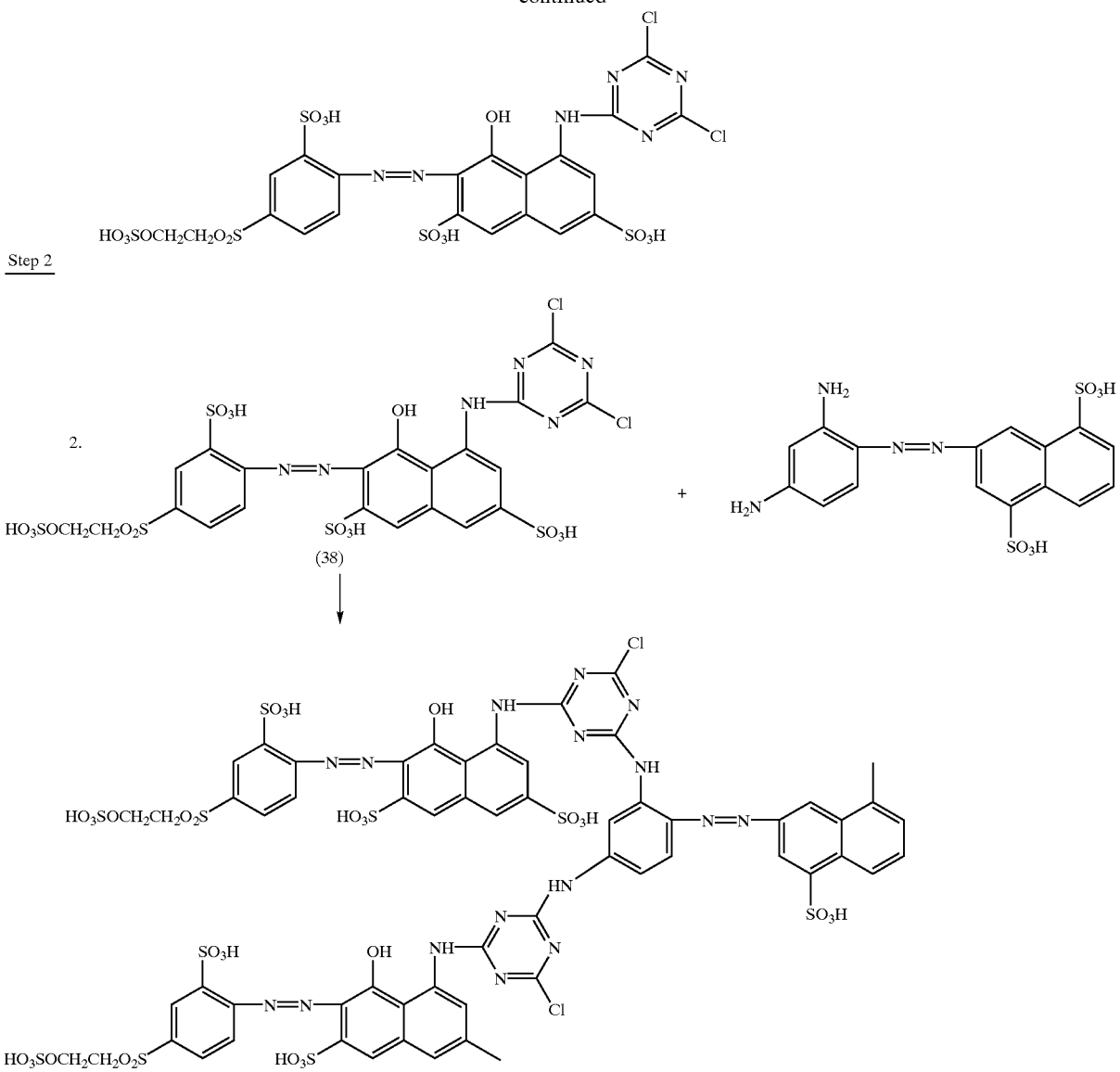

A solution of cyanuric chloride (31) (8.1 g, 0.044 mol) in acetone (150 mls) was added dropwise to a solution of 1-amino-8-hydroxy-3,6-naphthalene disulphonic acid (36) (15.5 g, 0.04 mol) in water (300 mls) cooled to <1° C. After 1 hr, condensation to give the dichlorotriazinyl coupler (37) was complete.

2N Sodium nitrite solution (27.5 mls) was added dropwise to an ice cold slurry of 2-amino-5-(-sulphatoethyl sulphone) benzene sulphonic acid (25.9 g, 0.05 mol) and concentrated HCl (15 mis) in water (150 mls). After 1 hr, excess nitrous acid was destroyed by addition of sulphamic acid, leaving a solution of diazonium salt (33). The solution of the diazonium salt (33) was then added to the dichlorotriazine coupler solution (37) and the mixture allowed to warm to room temperature maintaining the pH at 5. After 2 hrs, the product (38) was precipitated by the addition of methylated spirits then redissolved in water for further use.

2-Aminonaphthalene-4,8-disulphonic acid (19.5 g, 0.05 mol) in water (200 mls) and 2N sodium nitrite solution (27.5 mls) were mixed and the resulting solution added dropwise to a stirred mixture of ice/water (100 g) and concentrated HCl (15 mls). After 1 hr, excess nitrous acid was destroyed by the addition of sulphamic acid, leaving a solution of the diazonium salt.

Meta-phenylene diamine (5.0 g, 0.045 mol) was dissolved in 2N HCl (50 mls) and the solution added to the solution of the diazonium salt. The mixture was then maintained at pH 6 for 2 hrs, and the resulting precipitate filtered off and dried to give the monoazo diamine (39) (18.7 g). Analytical data were in full agreement with the expected structure.

A mixture of the dichlorotriazinyl dye (38) (0.0046 mol) and the diamine (39) (1.25 g, 0.0023 mol) in water (170 mls) at pH 5.0 was heated at 65° C. for 3 hrs, the pH being maintained by the addition of 2N sodium carbonate. The mixture was cooled and the product precipitated by the addition of methylated spirits. The precipitate was filtered off and dried to give reactive dye (2) (6.0 g) max=502 nm=51200. Analytical data were in full agreement wit the expected structure.

EXAMPLES 28–29

In Examples 28–29, the chromophoric linking group L of Example 27 was replaced by the respective groups shown in Table 2 below and the dyes were prepared in a manner analogous to that of Example 27.

TABLE 2

| Example No. | L | max/nm |
|---|---|---|
| 27 | (structure: NH, HN-substituted phenyl-N=N-naphthalene with two SO₃H groups) | 502 |
| 28 | (structure: NH, HN-substituted phenyl-N=N-phenyl-SO₃H) | 512 |
| 29 | (structure: NH, HN, CH₃-substituted phenyl-N=N-phenyl-SO₃H) | 508 |

What is claimed is:

1. Trisazo dye of the formula (I)

(I)

or an alkali metal salt thereof; wherein:
Ar₁ is an optionally substituted arylene group;
Ar₂ is an optionally substituted aryl group;
each of $R^1$, $R^2$, $R^3$ and $R^4$, independently, is H, alkyl or phenyl;
each of $X^1$ and $X^2$, independently, is a labile atom or group; and
each of $D^1$ and $D^2$, independently, is a chromophore group of the formula (IV)

wherein:
Ar₃ is an aryl group;
Y is a vinyl or allyl group or the group —CH₂CH₂V in which V is a leaving group;
a is zero, 1, 2 or 3;
b is zero, 1 or 2;
at least one of a and b is at least 1;
c is zero or 1 and when c is 1, the group SO₃H on the naphthalene nucleus
is substituted at the 5- or 6-position thereof; and
the bond (1) is substituted at the 6-, or 7-position of the naphthalene nucleus.

2. Trisazo dye according to claim 1, wherein each of $X^1$ and $X^2$, independently is a halogen atom or a pyridinium salt.

3. A process for colouring fibre material containing a group reactive with a reactive dye or a fibre blend containing the fibre material, which method comprises applying thereto a trisazo dye of the formula (1), given and defined in claim 1.

4. Trisazo dye according to claim 1, wherein each of $R^1$, $R^2$, $R^3$ and $R^4$, independently is hydrogen, methyl, ethyl, n-propyl or i-propyl.

5. Trisazo dye according to claim 2, wherein each of $R^1$, $R^2$, $R^3$ and $R^4$, independently is hydrogen, methyl, ethyl, n-propyl or i-propyl.

6. Trisazo dye according to claim 1, which dye has the formula (II)

(II)

wherein:
Ar₁ is a phenylene, naphthylene or diphenylene group;
each of $A^{11}$ and $B^{11}$, independently; is optionally present and is a halogen atom, an alkyl group, an alkoxy group, a hydroxy group, a carboxyl group or a sulphonic acid group or a salt thereof;
$C^{11}$ is a methyl group;
x is zero or 1; and
each of $D^1$, $D^2$, $R^1$, $R^2$, $R^3$, $R^4$, $X^1$, $X^2$ and Ar₂ is as defined in claim 1.

7. Trisazo dye according to claim 5, which dye has the formula (II)

(II)

wherein:
Ar₁ is phenylene, naphthylene or diphenylene group;
each of $A^{11}$ and $B^{11}$, independently, is optionally present and is a halogen atom, an alkyl group, an alkoxy group, a hydroxy group, a carboxyl group or a sulphonic acid group or a salt thereof;

$C^{11}$ is a methyl group;

x is zero or 1; and each of $D^1$ and $D^1$, independently, is a chromophore group of the formula

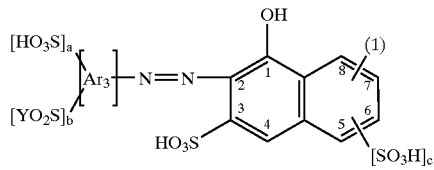
(IV)

wherein:

Ar$_3$ is an aryl group;

Y is a vinyl or allyl group or the group —CH$_2$CH$_2$V in which V is a leaving group;

a is zero, 1, 2 or 3:

b is zero, 1, 2 or 2;

at least one of a and b is at least 1;

c is zero or 1 and when c is 1, the group SO$_3$H on the naphthalene nucleus is substituted at the 5- or 6- position thereof; and the bond (1) is substituted at the 6- or 7- position of the naphthalene nucleus;

each of $X^1$ and $X^2$, independently, is a labile atom or group;

Ar$_2$ is an optionally substituted aryl group and $R^1$, $R^2$, $R^3$ and $R^4$, independently is hydrogen, methyl, ethyl, n-propyl or i-propyl.

8. Trisazo dye according to claim 1, which dye has the formula (III)

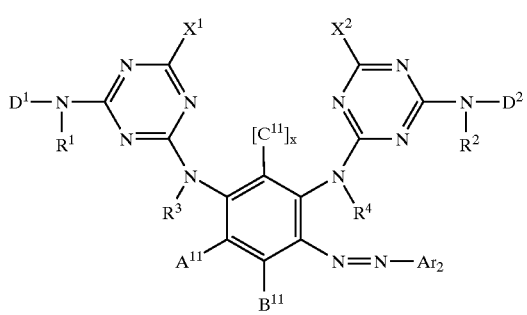
(III)

wherein each of $D^1$, $D^2$, $R^1$, $R^2$, $R^3$, $R^4$, $X^1$, $X^2$, and Ar$_2$, is as defined in claim 1, each of $A^{11}$ and $B^{11}$, independently, is optionally present and is a halogen atom, an alkyl group, an alkoxy group, a hydroxy group, a carboxyl group or a sulphonic acid group or a salt thereof;

$C^{11}$ is a methyl group;

x is zero or 1.

9. Trisazo dye according to claim 5, which dye has the formula (III)

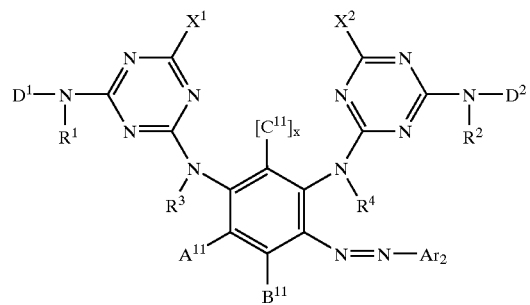
(III)

wherein each of $D^1$ and $D^2$, independently, is a chromophore group of the formula

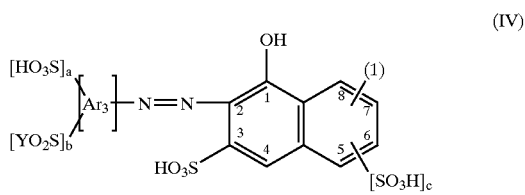
(IV)

wherein:

Ar$_3$ is an aryl group;

Y is a vinyl or allyl group or the group —CH$_2$CH$_2$V in which V is a leaving group;

a is zero, 1, 2or 3;

b is zero, 1 or 2;

at least one of a and b is at least 1;

c is zero or 1 and when c is 1, the group SO$_3$H on the naphthalene nucleus is substituted at the 5- or 6- position thereof; and the bond (1) is substituted at the 6- or 7-position of the naphthalene nucleus;

$R^1$, $R^2$, $R^3$ and $R^4$, independently is hydrogen, methyl, ethyl, n-propyl or i-propyl;

each of $X^1$ and $X^2$, independently, is a labile atom or group;

Ar$_2$ is an optionally substituted aryl group;

each of $A^{11}$ and $B^{11}$, independently, is optionally present and is a halogen atom, an alkyl group, an alkoxy group, a hydroxy group, a carboxyl group or a sulphonic acid group or a salt thereof;

$C^{11}$ is a methyl group;

x is zero or 1.

10. Trisazo dye according to claim 1, wherein each of $D^1$ and $D^2$, independently, is a chromophore of the formula

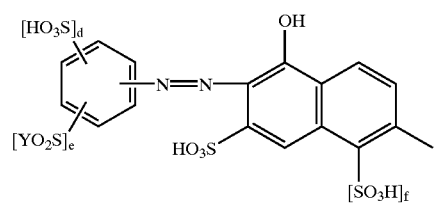
(V)

wherein:

d is zero, 1 or 2;

e is zero or 1;

f is zero or 1; and

Y is a vinyl or allyl group or a group —CH$_2$CH$_2$V in which V is a leaving.

11. Trisazo dye according to claim 1, wherein each of D$^1$ and D$^2$, independently is a chromophore of the formula

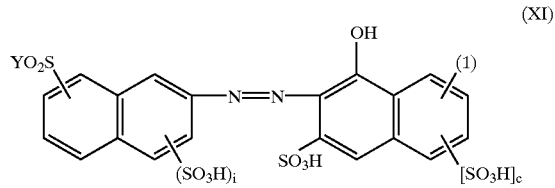

(XI)

wherein i is 1, 2 or 3 and a group SO$_3$H is ortho to the azo group; and each of Y, c and (1) is as defined in claim 1.

12. Trisazo dye according to claim 1, wherein each of D$^1$ and D$^2$, independently is a chromophore of the formula

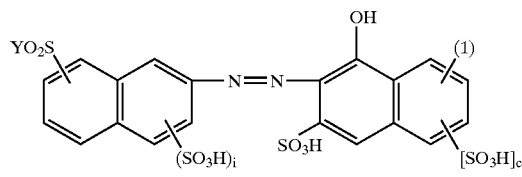

(XI)

wherein i is 1, 2 or 3 and a group SO$_3$H is ortho to the azo group.

13. A process for preparing the trisazo dye of claim 1, which process comprises reacting an arylazodiamine of the formula (XIV)

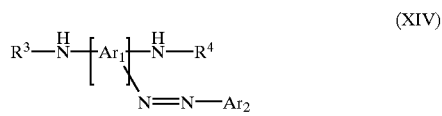

(XIV)

wherein each of Ar$_1$, Ar$_2$, R$^3$ and R$^4$ is as defined in claim 1, with an equimolar proportion of each of two reactive dyes respectively of the formula

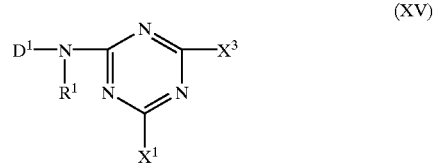

(XV)

wherein each of D$^1$, R$^1$ and X$^1$ is as defined in claim 1 and X$^3$ is a labile atom or group capable of reaction with an amine and

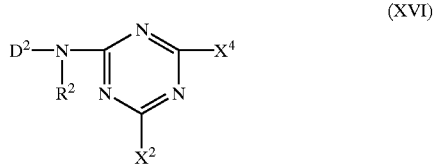

(XVI)

wherein each of D$^2$, R$^2$ and X$^2$ is as defined in claim 1 and X$^4$ is a labile atom or group capable of reaction with an amine, or when each of D$^1$, R$^1$, X$^1$ and X$^3$ is the same as D$^2$, R$^2$, X$^2$ and X$^4$ respectively, with two moles of a reactive dye of the formula (XV) or (XVI) per mole of the diamine of the formula (XIV), to obtain the dye of the formula (I).

* * * * *

UNITED STATES PATENT AND TRADEMARK OFFICE
CERTIFICATE OF CORRECTION

PATENT NO. : 6,864,360 B2  Page 1 of 1
DATED : March 8, 2005
INVENTOR(S) : Warren J. Ebenezer It is certified that error appears in the above-identified patent and that said Letters Patent is hereby corrected as shown below:

Column 28,
Line 1, "2or3;" should read -- 2 or 3; --.

Column 29,
Line 6, "$D^1$ and $D^1$" should read -- $D^1$ and $D^2$ --.
Line 25, "b is zero, 1 or 2 or 2;" should read -- b is zero, 1 or 2; --.

Column 30,
Line 35, "a is zero, 1 or 2or 3;" should read -- a is zero, 1 or 2 or 3 --.

Signed and Sealed this

Fourteenth Day of June, 2005

JON W. DUDAS
*Director of the United States Patent and Trademark Office*